April 2, 1935.  M. CORNELL  1,996,461
LIQUID MEASURING AND DISPENSING APPARATUS
Filed Oct. 17, 1932  4 Sheets-Sheet 1
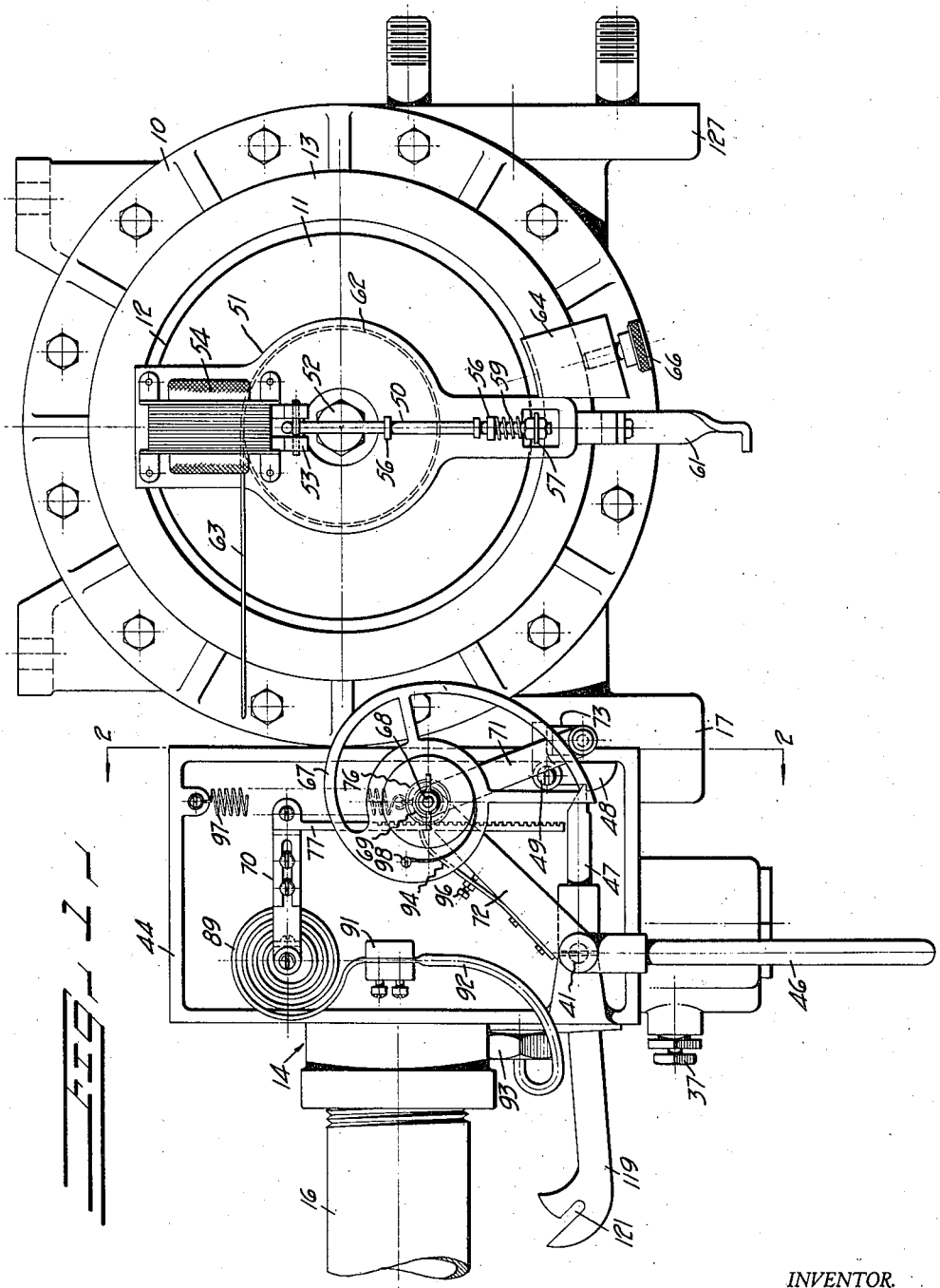
INVENTOR.
MEAD CORNELL
BY White, Prost, Fisher & Lothrop
ATTORNEYS.

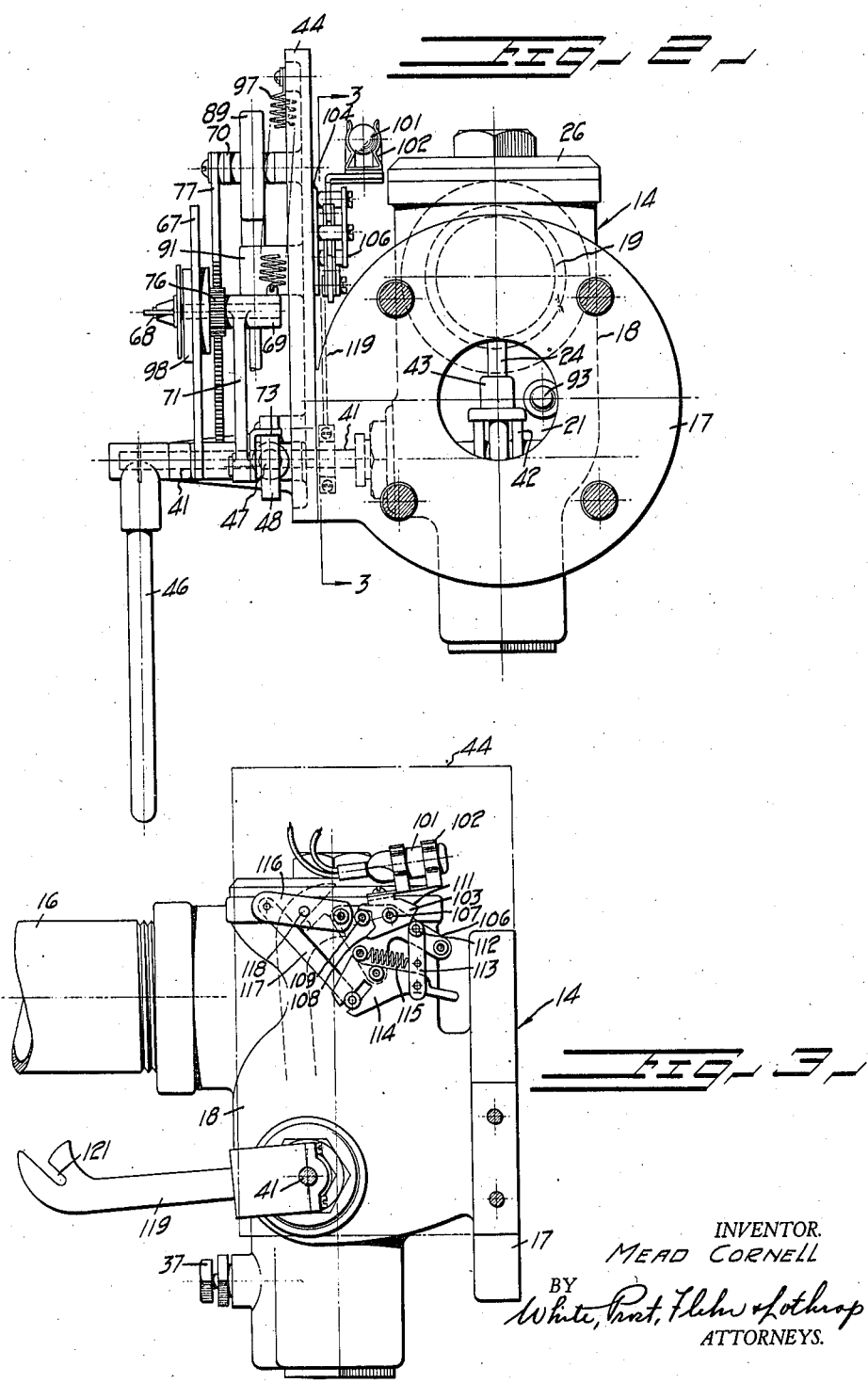

April 2, 1935. M. CORNELL 1,996,461
LIQUID MEASURING AND DISPENSING APPARATUS
Filed Oct. 17, 1932 4 Sheets-Sheet 3
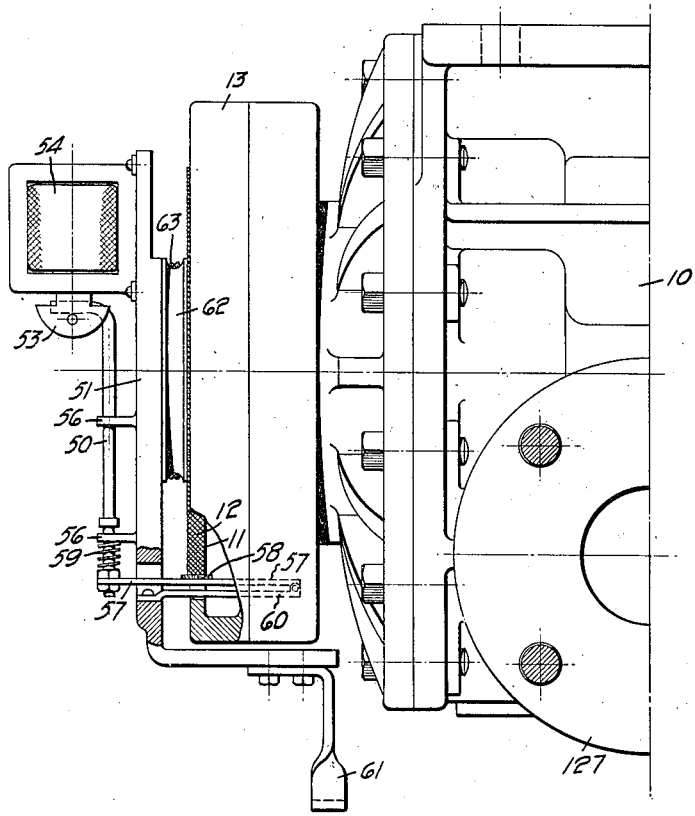
INVENTOR.
MEAD CORNELL
BY
ATTORNEYS.

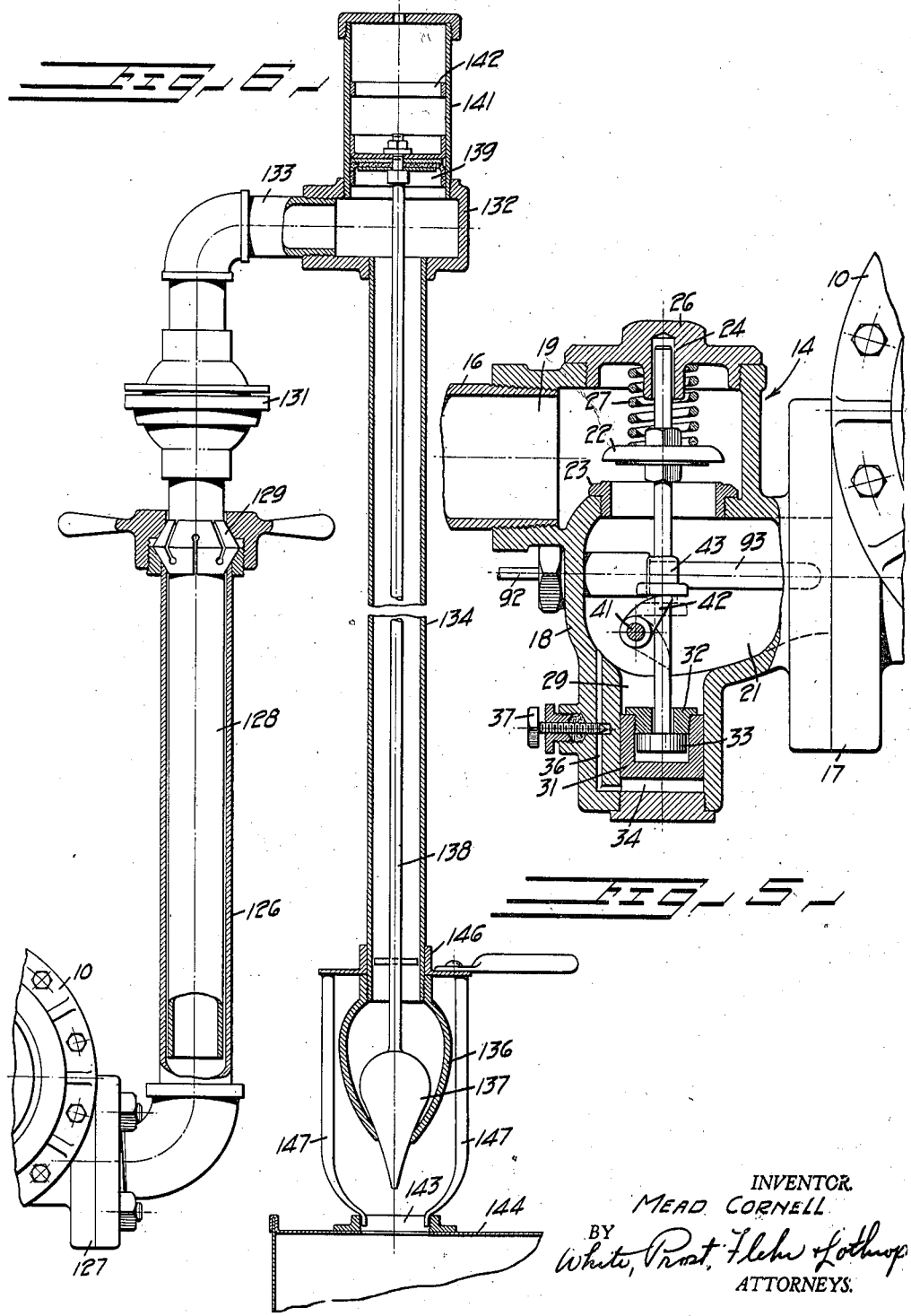

Patented Apr. 2, 1935

1,996,461

UNITED STATES PATENT OFFICE 1,996,461

LIQUID MEASURING AND DISPENSING APPARATUS

Mead Cornell, San Francisco, Calif., assignor to The Merrill Company, San Francisco, Calif., a corporation of California Application October 17, 1932, Serial No. 638,045

11 Claims. (Cl. 221—101)

This invention relates generally to apparatus for discharging or delivering predetermined quantities of liquid. Such apparatus can be employed to advantage in filling containers with measured quantities of oil or other liquids.

It is a general object of the present invention to provide an apparatus of the above character which will enable delivery of predetermined quantities of liquid with respect to a standard temperature basis, irrespective of the fact that the temperature of the liquid flowing thru the apparatus may vary from time to time. In attaining this object my invention is characterized by the provision of automatic compensating means, whereby the temperature of the liquid flowing thru the apparatus is taken into account, to automatically control the quantity of the liquid finally delivered.

A further object of the invention is to provide an apparatus of the above character having a cycle of operation which can be initiated by actuation of a single operating member or lever, and which will then automatically continue functioning until the cycle of operation is completed.

A further object of the invention is to provide apparatus of the above character which can be adjusted within comparatively close limits, which can be readily adapted for the dispensing of different liquids having different temperature coefficients of expansion, and which will be reliable and accurate in operation.

Another object of the invention is to provide a shut-off valve in an apparatus of the above character which will avoid detrimental hydraulic hammer.

Another object of the invention is to provide a novel form of discharge nozzle and fluid operated valve at the discharge end of the line connected to the outflow side of the apparatus, which will facilitate discharge of liquid into containers to be filled.

Further objects of the invention will appear from the following description in which the preferred embodiments of the invention have been set forth in detail in conjunction with the accompanying drawings.

Referring to the drawings:

Figure 1 is a side elevational view, illustrating apparatus incorporating the present invention.

Fig. 2 is a cross-sectional detail taken along the line 2—2 of Fig. 1.

Fig. 3 is a cross-sectional detail taken along the line 3—3 of Fig. 2.

Fig. 4 is a half end view of the apparatus illustrated in Fig. 1.

Fig. 5 is a side elevational detail, in transverse cross section, illustrating the construction of the shut-off valve utilized in conjunction with my apparatus.

Fig. 6 is a side elevational view, partly in cross section, illustrating the discharge pipe and fluid operated valve means utilized in conjunction with the same, which is connected to the outflow side of the metering device.

My invention can be outlined briefly as comprising a suitable metering device, of the volumetric displacement type, associated with valve means for controlling flow of liquid thru the same. This valve means is in turn under the control of a member or members driven by moving parts of the metering device. These parts of the apparatus are further associated with compensating means, which is arranged to automatically correct the apparatus for varying temperatures of the liquid flowing thru the same.

Referring now to the drawings, a metering device of the volumetric type has been indicated generally at 10. While the specific construction of this metering device may vary, I can utilize with advantage a metering device of the gyrating piston type, such as disclosed in my Reissue Patent No. 18,067. This metering device is associated with a member moved at a rate dependent upon the volume of liquid flowing thru the device, and this member is preferably in the form of a disc 11, having a knurled or roughened periphery 12 for a purpose to be presently explained. A suitable speed reducing gearing is utilized to form an operative drive between disc 11, and the moving parts of the metering device 10. The parts of this speed reducing drive can be enclosed within a suitable housing 13.

Associated with the metering device 10, I provide a suitable shutoff valve 14 (Fig. 2). This valve is interposed between the pipe line 16, which connects to a source of liquid, and the inflow side of the metering device, the connection to the metering device being thru the coupling 17. Before explaining the novel construction of the particular shut-off valve 14 illustrated in the drawings, it may be explained that this valve is associated with suitable mechanism whereby the valve can be actuated to open position, but which mechanism can be tripped to effect automatic closing of the valve.

Referring now to Fig. 5, the particular form of shut-off valve 14 illustrated, consists of a valve housing or casing 18, having an inflow passage 19 communicating with pipe line 16, and an outflow passage 21 communicating with the metering device thru coupling 17. Disposed within the valve casing 18, there is a movable valve member 22 of the poppet type, which cooperates with a stationary valve seat 23 formed within the valve casing. Valve member 22 is mounted upon the valve stem or rod 24, the upper end of which is slidably and loosely retained within the closure cap 26 for the valve casing. A compression spring 27 serves to normally urge the valve member 22 toward closed position.

The lower end of valve stem 24 is associated with suitable cushioning or dash pot means which can be formed as follows:—The lower end of casing 18 is formed to provide a cylinder 29, within which a piston 31 is slidably fitted. Piston 31 is hollow, and is provided with a closure plug 32, thru which the lower end of stem 24 loosely extends. The lower end of stem 24 is provided with an enlarged head 33, which retains the piston 31 to the stem, but which permits a certain amount of lost motion between these parts. The space 34 beneath piston 31, is in communication with the outflow passage 21, thru a small duct 36, throttled by an adjustable needle valve 37.

Assuming that valve member 22 is released from open position, it is evident that the lost motion connection between stem 24 and piston 31 will permit this valve member to move rapidly to its closed position. However before the valve member 22 can close entirely upon seat 23, piston 31 must move together with stem 24 and thus the final closing movement is retarded. I have found that a valve of this character, that is one having retarded final closing movement, is desirable in that it will eliminate hydraulic hammer upon the pipe line 16.

To provide mechanism for opening and closing movements of the valve member 22, I provide a rotatable shaft 41, which extends thru one side of the valve casing 18, and which has a cam member 42 engaging its inner end. Cam member 42 is adapted to engage a flanged collar 43, which is secured to the valve stem 24. It is obvious that when shaft 41 is rotated in a counterclockwise direction as viewed in Fig. 5, cam member 42 raises the flanged collar 43, which in turn causes valve member 22 to be moved to open position. When shaft 41 is released and permitted to return in a clockwise direction, for example to the position illustrated in dotted lines in Fig. 5, the valve member 22 is permitted to close.

The remainder of the mechanism associated with shaft 41 described above, can be made clear by particular reference to Figs. 1 and 2. The outer end of shaft 41 extends thru a supporting plate 44, which in turn is mounted upon one side of the casing 18 of the shut-off valve 14. Secured to the outer end of shaft 41, adjacent the outer side of plate 44, there is an operating lever 46. Likewise secured to shaft 41, there is an arm 47, the outer end of which is adapted to engage and be retained by a latch 48. Latch 48 is provided with a pivotal connection 49 to the supporting plate 44 and is associated with other parts to be presently explained. When lever 46 is in the position illustrated in solid lines in Fig. 1, cam member 42 is in such position as to retain valve member 22 open as shown in Fig. 5. However when latch 48 is actuated to release arm 47, lever 46, under the urge of compression spring 27, is free to rotate in a clockwise direction as viewed in Fig. 1, to permit valve member 22 to close.

In my apparatus, the mechanism just described for effecting opening and closing movements of the valve member 22, is adapted to be tripped or released by a member which is clutched to the rotating disc 11, and which when in such clutching engagement is caused to move thru a predetermined path. Thus as appears more clearly in Figs. 1 and 4, arranged in front of the rotating disc 11, there is a structure 51. This structure is journaled to rotate concentric to the axis of rotation of disc 11, as by means of a stud 52. Disposed adjacent the outer face of structure 51, there is a rod 50, one end of which has an operative connection to the plunger 53 of an electrical solenoid 54. Rod 50 is slidably guided within lugs 56, which in turn are mounted upon the face of structure 51. The other end of rod 50, carries a finger 57, one portion of which extends along side the knurled or roughened peripheral surface 12 of the disc 11. A pad 58, of fibrous or other suitable material, is secured to finger 57, to afford an effective grip upon the periphery of disc 11. The rear end of finger 57 is pivotally connected to an arm 60, which in turn is fixed to structure 51. A compression spring 59 normally urges rod 50 in a direction to disengage finger 57 from disc 11. Finger 57 is moved to engaged position, upon actuation of the solenoid 54, and when in such engaged position, structure 51 is caused to rotate in unison with disc 11. Structure 51 likewise carries a member 61, which in its movement engages certain parts to effect tripping of latch 48, as will be presently explained.

Structure 51 is preferably biased to rotate in a counterclockwise direction, as viewed in Fig. 1, against an adjustable stop. As an example of suitable biasing means I have shown a pulley 62 secured to the rear side of structure 51, and wound about this pulley there is a flexible cord 63. The free end of this cord is carried over another conveniently located spring biased pulley, or connected to a suitable weight.

To form a stop for limiting rotation of structure 51 in a counterclockwise direction as viewed in Fig. 1, I have shown a block 64 slidably carried by the forward face of gear housing 13, and capable of being locked in any desired position by means of set screw 66. It is therefore evident that when solenoid 54 is deenergized, and finger 57 disengaged from disc 11, structure 51 will be held against stop block 64 in the position illustrated in Fig. 1. Assuming that disc 11 is being rotated by flow of liquid thru the metering device, and that solenoid 54 is energized, structure 51 is clutched to rotate in unison with disc 11, against the bias afforded by cord 63. However immediately upon deenergizing solenoid 54, structure 51 is returned to its initial position, independently of the disc 11.

The means which I have utilized to effect actuation of latch 48, by member 61, incorporates compensating means responsive to the temperature of liquid flowing thru the apparatus. The temperature compensating means preferably utilizes a cam 67, of relatively light construction, which is removably secured to a shaft 68. Shaft 68 is in turn carried by a hub 69, to which the upper ends of arms 71 and 72 are secured. The lower end of arm 71 carries a shoe 73, which underlies one arm of the latch 48. The lower end of arm 72 is pivotally supported by shaft 41. Before describing the mechanism for determining the setting of cam 67, it may be explained that this cam is interposed in the path of movement of member 61. Assuming that member 61 is traveling in a clockwise direction as viewed in Fig. 1, its engagement with cam 67, causes this cam to swing about the lower end of arm 72 in a counterclockwise direction, to rotate latch 48 and thus cause this latch to release arm 47.

In order to automatically position cam 67 in accordance with the temperature of liquid flowing thru the apparatus, I have shown a pinion 76 fixed with respect to the cam, and which in turn is engaged by a toothed rack 77. The upper end of this rack 77 has a pivotal connection to one end of an adjustable arm 70, the other end of this arm being connected to the spiraled element 89 of a temperature responsive means. Spiraled element 89 can be in the form of a spiral flattened tube, carried by the block 91, and connected by tube 92 to a bulb 93. This bulb can be conveniently located directly within the housing 18 for the shut-off valve as shown in Fig. 5, so that it will be affected directly in accordance with the temperature of liquid flowing thru the metering device. It is apparent that various types of temperature responsive elements can be utilized to vary the positioning of arm 70 and toothed rack 77, in accordance with the temperature of the liquid. In the particular type of means shown, varying temperatures cause varying pressures within the spiral element 89, to vary the positioning of arm 70.

In order to insure engagement between the rack 77 and pinion 76 at all times, I provide suitable means for urging these parts together, such as a leaf spring 94 (Fig. 1) mounted upon arm 72. The free end of this leaf spring is caused to press upon the toothed rack 77, to urge it into engagement with pinion 76, and the amount of force applied by the leaf spring can be adjusted by screw 96.

It is evident from the above that when arm 70 is moved in accordance with varying temperatures of liquid in contact with bulb 93, the setting of cam 67 is varied, and the setting of cam 67 determines the extent of movement of member 61, with a given setting of block 64, to effect tripping of latch 48. For example if the liquid being handled is oil, and the temperature of the oil flowing thru the device increases, cam 67 is rotated to a corresponding new position in a clockwise direction, so that in effect a greater extent of movement of member 61 is required, from the time this member leaves stop 64, until the time that it causes tripping of latch 48. Since as will be presently explained, tripping of latch 48 effects closing of shut-off valve 14, it likewise follows that when the temperature of the oil increases, the apparatus automatically permits a definitely greater quantity of oil to flow thru the apparatus before flow is arrested by closing of valve 22, so that a proper quantity of oil will be dispensed with respect to a standard temperature basis.

In order to afford somewhat greater sensitivity for the temperature compensation, I prefer to counterbalance the weight of cam 67 and certain of the parts associated with the same, by means of a tension spring 97. The upper end of this spring is shown secured to the supporting plate 44 and the lower end is shown connected to hub 69 (Fig. 2). Likewise I preferably bias cam 67 in a counterclockwise direction, with respect to shaft 68, in order to reduce the lag in movement of cam 67 for a decrease in temperature. This can be readily accomplished by a small hair spring 98, one end of which is connected to cam 67, and the other end of which is connected to shaft 68. Without such a hair spring the lag for a decrease in temperature tends to be greater than the lag for an increase in temperature. With such a spring the respective lags are made substantially equal.

In addition to the means which have been previously described, I provide means for controlling the supply of current to the solenoid 54, in order to automatically deenergize this solenoid upon tripping of latch 48, thus permitting member 61 to return to its initial position. While various forms of switching means in conjunction with linkage mechanism can be utilized for accomplishing this result, I have shown an arrangement which includes a mercury tube switch 101. The contacts of this switch are connected in series with an electrical circuit, which includes the solenoid 54. In this connection note that electrical connections can be made to solenoid 54, thru slip rings, or simply by the means of a flexible electric cord. A clip mounting 102 is provided for tube 101, and this mounting is carried upon a tilting block 103. (Fig. 3.) Block 103 is pivotally mounted between the side plates 104 and 106, (Fig. 2) by means of pivot pin 107. Tilting movement of block 103 is limited by spaced fingers 108, which engage a fixed pin 109. This tilting block is also provided with oppositely inclined cam faces 111, which are adapted to be engaged by roller 112, this roller being in turn carried between corresponding ends of a pair of links 113. The lower ends of links 113 are pivotally connected to a rocker 114. Roller 112 is urged into engagement with the cam surfaces 111, by the tensioned spring 115. One end of the link 116 is likewise pivotally secured between plates 104 and 106, and the free end of this link has a pivotal connection with one end of the link 117. The other end of link 117 has an adjustable pivotal connection with the rocker 114. A laterally projecting actuating pin 118, is mounted upon link 116. When actuating pin 118 is forced downwardly, the movement imparted to links 116 and 117 is transmitted thru rocker 114, to cause roller 112 to move upwardly until it engages the uppermost one of the cam faces 111. The biasing of links 113 then immediately causes the block 103, to tilt in a clockwise direction as viewed in Fig. 3, to open the contacts of the mercury switch 101. Similarly upward movement of pin 118, causes block 103 to tilt in the opposite direction, to effect closing of the contacts of switch 101.

To effect automatic actuation of pin 118, I provide an arm 119, the upper end of which is provided with an inclined cam slot 121. The inner end of arm 119 is mounted upon shaft 41, so as to be rotatable together with the same. Cam slot 121 is adapted to receive pin 118, so that when arm 119 is swung in a clockwise direction as viewed in Fig. 3, to the position illustrated in dotted lines, it causes a downward movement of pin 118, to operate the switch 101. Likewise when the arm 119 is swung in a counterclockwise direction from the position illustrated in dotted lines, pin 118 is returned to its original position.

It has been previously mentioned that my apparatus is particularly adaptable for filling containers with measured quantities of liquid. In this connection it is desirable to have the apparatus connected to a discharge nozzle for discharging the liquid into the containers being filled. Likewise it is desirable to provide a fluid pressure operated valve, in conjunction with the nozzle, so that when flow of liquid thru the metering device is interrupted by closing of the shut-off valve 14, liquid remaining in the metering device, and in the conduit connected to the outflow side of the same, is trapped. Fig. 6 illustrates a novel form of nozzle and associated conduit for connection with the outflow side of the metering device. Thus the outflow side of the metering device 10 has been shown connected to the upstanding pipe 126, by the coupling 127. A second pipe 128 telescopes within pipe 126, and a suitable gland 129 at the upper end of pipe 126, permits vertical adjustment of pipe 128, and also permits this pipe to swing about a vertical axis. A universal or ball and socket coupling 131 couples the upper end of pipe 128, to a casing 132, thru a pipe section 133. Depending from casing 132, there is a tube 134, to which a discharge nozzle 136 is secured.

To provide a fluid operated valve for the nozzle 136, I have shown a stream-lined valve member 137, which is connected to the lower end of an actuating rod 138. The upper end of rod 138 is connected to a piston 139, which operates within a cylinder 141. The upper side of piston 139 is exposed to substantially atmospheric pressure, while the lower side of this piston is exposed to the pressure of liquid within casing 132. Normally valve member 137 is closed by gravity. However when liquid is caused to flow thru the metering device, by opening the shut-off valve 14, the resulting increase in liquid pressure in casing 132 causes piston 139 to be forced upwardly, to move the valve member 137 to open position. Movement towards open position is limited by the ring 142, arranged within cylinder 141. When valve member 137 is in full open position, a solid jet or stream of liquid is caused to be discharged from nozzle 136, because of the streamlining of this nozzle, in conjunction with the streamlining of valve 137. With such a nozzle the discharged stream of liquid is so solid in character that the nozzle may be located above the opening 143 of the container 144 being filled. Means such as illustrated can be employed for guiding and retaining the nozzle in a position to discharge into the opening in the top of the container. Such a guide means may consist of a flanged collar 146, slidably carried on the lower end of the tube 134. Secured to collar 146, are a plurality of depending fingers 147, the lower ends of which may be engaged within the opening 143. With my nozzle an operator may visually inspect the liquid as it is being discharged into the container, and the solid stream discharged minimizes foaming and splashing, and makes possible an increased filling rate. When the pressure of liquid within casing 132 fails, which happens when the shut-off valve 14 is automatically closed, valve member 137 immediately drops downwardly to closed position by gravity, to trap the liquid between this valve member and the outflow side of the shut-off vave 14, thus making for accurate measurement.

Operation of my apparatus may now be reviewed in entirety. Assuming that the inflow side of the apparatus is connected to a source of liquid to be dispensed in measured quantities, with respect to a standard temperature basis, and that the nozzle 136 is arranged to discharge a stream of liquid into a container to be filled, the operator turns lever 46 in a counterclockwise direction, as viewed in Fig. 1, to the position shown in solid lines in this figure. During the first part of its movement, arm 119, which has previously occupied the position shown in dotted lines in Fig. 3, causes closing of switch 101, and therefore causes solenoid 54 to be energized to clutch the structure 51 to the disc 11. During the latter part of the movement of lever 46, rotation of cam member 42 lifts the valve member 22 of the shut-off valve 14, to start the flow of liquid thru the metering device 10. Final movement of lever 46 causes arm 47 to be engaged by latch 48. Flow of liquid thru the measuring device causes rotation of disc 11, at a rate corresponding to the volumetric rate of flow of liquid thru the same. Member 61, likewise moves at a corresponding rate. As the apparatus nears the end of its cycle of operation, member 61 engages one point upon the cam 67, and further movement of member 61 therefore causes a movement of cam 67 to a sufficient extent to cause arm 71 to release latch 48 from the arm 47. Immediately upon release of latch 48, lever 46, under the force of compression spring 27, immediately rotates rapidly in a clockwise direction as viewed in Fig. 1, to permit closing of valve 22, and to cause arm 119 to engage pin 118 to effect opening of the switch 101. Opening of switch 101 causes the solenoid 54 to be deenergized, and the resulting release of the clutching engagement with disc 11, causes structure 51 to immediately return against the stop block 64, under the bias afforded by cord 63.

It has previously been explained that the angular positioning of cam 67 is dependent upon the temperature of the liquid passing thru the apparatus. Assuming that a given liquid is being dispensed, the formation of cam 67 is such that for variations in the temperature of the liquid flowing thru the apparatus, the effective distance travelled by member 61, from the time flow of liquid is initiated, to the time the flow is interrupted, is automatically varied by an amount which will compensate for the temperature coefficient of expansion of the liquid. In other words this compensating means makes it possible to measure the liquid accurately with respect to a standard temperature basis, so that such measurements will remain accurate irrespective of variations which may occur from time to time in the temperature of the liquid being dispensed. Obviously if the apparatus is to be utilized for the measuring of liquids having different temperature coefficients of expansion, cams of varying curvatures, for the different liquids, must be supplied.

I claim:

1. In an apparatus for measuring quantities of liquid, a metering device of the volumetric displacement type having its inflow side adapted for connection with a source of liquid, a member movable in accordance with the volume of liquid flowing thru said device, means operated in accordance with the extent of movement of said member for interrupting flow of liquid thru the metering device, and compensating means operated in accordance with the temperature of liquid flowing thru said device for modifying operation of said last mentioned means.

2. In an apparatus for measuring quantities of liquid, a metering device of the volumetric displacement type having its inflow side adapted for connection with a source of liquid, a member movable in accordance with the volume of liquid flowing thru said device, means operated in accordance with the extent of movement of said member for interrupting flow of liquid thru the metering device, and compensating means operated in accordance with the temperature of liquid flowing thru the device for modifying the effective extent of movement of said member to cause interruption of flow thru said device.

3. In an apparatus for measuring quantities of liquid with respect to a standard temperature basis, a metering device of the volumetric displacement type, the inflow side of said device being adapted for connection with a source of liquid, a member adapted to move in accordance with flow of liquid thru said device, a valve for controlling flow of liquid thru the metering device, means for causing automatic actuation of said valve responsive to movements of said member, and temperature compensating means responsive to the temperature of liquid flowing thru said device for modifying action of said last mentioned means.

4. In apparatus for measuring quantities of liquid with respect to a standard temperature basis, a metering device of the volumetric displacement type, the inflow side of said device being adapted for connection with a source of liquid, a member adapted to be moved by the meter in accordance with the volume of liquid caused to flow thru the same, a valve for controlling flow of liquid thru said metering device, mechanism capable of being actuated to open said valve and being adapted to be tripped to effect closing of the same, means for causing said member in its movement to effect tripping of said mechanism, and temperature compensating means associated with said last mentioned means and responsive to the temperature of liquid caused to flow thru said device.

5. In an apparatus for measuring quantities of liquid with respect to a standard temperature basis, a metering device of the volumetric displacement type, the inflow side of said device being adapted for connection with a source of liquid, a member adapted to be moved in accordance with the volume of liquid caused to flow thru the device, a valve for controlling flow of liquid thru said metering device, mechanism associated with said valve means adapted to be tripped to effect closing of the valve, and means adapted to be actuated by said member to effect tripping of said mechanism, said last named means including a temperature compensator responsive to the temperature of liquid flowing thru said metering device.

6. In an apparatus for measuring quantities of liquid, a metering device, a member adapted to be rotated in accordance with the volume of liquid caused to flow thru the device, the inflow side of said device being adapted for connection with a source of liquid, a valve for controlling flow of liquid thru said metering device, mechanism associated with said valve adapted to be tripped to effect closing of the same, another member movable thru a predetermined path to effect tripping of said last mentioned means, and means for automatically clutching said last member to said rotatable member upon effecting opening of said valve.

7. In an apparatus for measuring volumes of liquid with respect to a standard temperature basis, a metering device of the volumetric displacement type, the inflow side of said device being adapted for connection with a source of liquid to be measured, a member adapted to rotate in accordance with the volume of liquid caused to flow thru the device, a valve for controlling flow of liquid thru said device, mechanism associated with said valve adapted to be tripped to effect automatic closing of the same, another member movable thru a predetermined path from an initial fixed position, means for automatically clutching said last member to said rotatable member upon opening said valve, means including a cam interposed in the path of movement of said member and serving to effect tripping of said mechanism when actuated, and temperature compensating means operated responsive to the temperature of liquid flowing thru said device for automatically varying the positioning of said cam.

8. In apparatus for measuring quantities of liquid with respect to a standard temperature basis, a metering device of the volumetric displacement type, the inflow side of said device being adapted to be connected to a source of liquid to be measured, a member adapted to be rotated in accordance with the volume of liquid flowing thru the device, a valve for controlling flow of liquid thru the metering device, mechanism associated with said valve adapted to be tripped to effect closing of said valve, and a mechanism including a lever adapted to be actuated to effect opening of said valve and setting of said mechanism, another member adapted to move thru a predetermined path from an initial position, means serving to clutch said last member to said rotatable member upon movement of said lever to open said valve, means interposed in the path of movement of said last member to effect tripping of said mechanism, said means including a cam, said cam being so formed that varying movements of the same will serve in effect to vary the extent of movement of said last member required to effect tripping of said mechanism, temperature responsive means operating in accordance with the temperature of liquid flowing thru said device for automatically varying the positioning of said cam, means to effect automatic declutching of said other member with respect to said rotatable member upon tripping of said mechanism, and means for returning said other member to its initial position following declutching of the same.

9. In apparatus for measuring quantities of liquid with respect to a standard temperature basis, a metering device of the volumetric displacement type, the inflow side of said device being adapted to be connected to a source of liquid to be measured, a rotatable member driven by said metering device, a valve normally urged toward closed position for controlling flow of liquid through the metering device, mechanism associated with said valve adapted to be tripped to permit closing of the valve from open position of the same, said mechanism including a lever adapted to be actuated to effect setting of the same and opening of said valve, another member adapted to move in a predetermined path from an initial position, electrical means serving when energized to clutch said last mentioned member to said rotatable member, means interposed in the path of movement of said last member to effect tripping of said mechanism, said last mentioned means including a cam, said cam being so formed that varying movements of the same will serve in effect to vary the movement of said last member required to effect tripping of said mechanism, temperature responsive means operating in accordance with the temperature of liquid flowing through said device for automatically varying the positioning of said cam, a switch for controlling the supply of current to said electrical means, and means for automatically closing said switch upon effecting opening of said valve and for automatically opening said switch upon automatic closing of said valve.

10. In apparatus for measuring quantities of liquid, a metering device of the volumetric displacement type, the inflow side of said device being adapted for connection with a source of liquid, a valve for controlling flow of liquid thru said device, and means actuated by the metering device for effecting automatic closing of said valve, said valve comprising a valve member biased toward closed position, and means for retarding final closing movement of said valve member.

11. In apparatus for dispensing measured quantities of liquid, a metering device of the volumetric displacement type, the inflow side of said device being adapted for connection with a source of liquid, a valve for controlling flow of liquid thru said device, means actuated by the metering device for effecting automatic closing of said valve, after a predetermined quantity of liquid has flowed thru said device, a stream-lined nozzle connected to the outflow side of said device, and fluid pressure operated valve means associated with said nozzle, said valve means including a stream-lined valve member whereby a solid stream of liquid is discharged from said nozzle.

MEAD CORNELL.